United States Patent [19]

Tabata et al.

[11] Patent Number: 4,662,712
[45] Date of Patent: May 5, 1987

[54] NON-METALLIC SELF-SUPPORTING AERIAL OPTICAL CABLE

[75] Inventors: Yusuke Tabata; Eiji Hayasaka, both of Miyagi; Toshitomo Hashimoto; Hiroaki Horima, both of Kanagawa; Toshiyuki Omori; Akira Kurosawa, both of Miyagi, all of Japan

[73] Assignees: Tohoku Electric Power Co., Inc.; Sumitomo Electric Industries, Ltd.; Kitanihon Electric Wire Co., all of Japan

[21] Appl. No.: 562,883

[22] Filed: Dec. 19, 1983

[30] Foreign Application Priority Data

Dec. 18, 1982 [JP] Japan ............................. 57-191818[U]

[51] Int. Cl.$^4$ .................................................. G02B 6/44
[52] U.S. Cl. .................................. 350/96.23; 350/96.10
[58] Field of Search ................... 350/96.23; 170/68 R, 170/70 A

[56] References Cited

U.S. PATENT DOCUMENTS 4,172,106  10/1979  Lewis ............................ 350/96.23 X

FOREIGN PATENT DOCUMENTS

| 2239742 | 4/1975 | France | 350/96.23 |
| 0095906 | 7/1980 | Japan | 350/96.23 |
| 56-86712 | 11/1981 | Japan | 350/96.23 |
| 1534279 | 11/1978 | United Kingdom | 350/96.23 |
| 1571110 | 7/1980 | United Kingdom | 350/96.23 |

OTHER PUBLICATIONS

"Flexibility & Bend Limitation of Single Fibre Optical Cables" by Whitehead, Sixth European Conference on Optical Communication, York, London (16-19), Sep. 1980.

*Primary Examiner*—William L. Sikes
*Assistant Examiner*—Akm E. Ullah
*Attorney, Agent, or Firm*—Sughrue, Mion, Zinn, Macpeak, and Seas

[57] ABSTRACT

A non-metallic self-supporting aerial optical cable is comprised of a suspension wire and optical cable which are made of non-metallic material and have non-metallic sheaths. The optical cable and suspension wire are maintained substantially parallel by a number of spaced apart connecting members. The optical cable is allowed to sag between the connecting members in order to withstand tensile forces which result from wind, snow and the like.

7 Claims, 6 Drawing Figures

NON-METALLIC SELF-SUPPORTING AERIAL OPTICAL CABLE

BACKGROUND OF THE INVENTION

This invention relates to a self-supporting aerial optical cable in which a non-metallic element is used, as compared to a metallic element, as a cable component.

As is well-known in the prior art, an optical fiber is formed of a dielectric material and therefore is not subjected to electromagnetic induction from a power line. As a result, a non-metallic optical cable, in which no metallic elements are employed as cable components, is frequently used in applications where it is necessary or practical for the optical cable to be mounted on the power line.

FIG. 1 shows a conventional non-metallic optical cable. An optical fiber core 11, as well as a cable component such as a plastic cord 12 or the like, is twisted around a tension member 13 formed of a fiber glass reinforced plastic rod (hereinafter referred to as F.R.P. rod) or Kevlar rod and the like. A shock absorbing member 14 is made of, for example, plastic yarn and is wound around the optical fiber core 11 to protect the latter against external pressure. A plastic tape 15 is then wound around the shock absorbing member 14 and is provided with a sheath 16 of polyethylene or the like circumferentially about the tape 15. The non-metallic optical cable according to such a configuration is never subjected to electromagnetic induction, as is an optical cable in which a metallic element, such as a copper wire or the like, is used as the tension member. The optical cable thus provides a measure of safety during maintenance and inspection, and it is not necessary to provide a ground for induced current, thereby simplifying the installation of the optical table.

When the non-metallic optical cable is used as an aerial cable, it tends to rely on a conventional hanger or suspension wire system. However, either a hanger or suspension wire is comprised of a metallic element, so that not only is the non-metallic optical cable compromised by the inclusion of a metallic element, but the cable may also be subjected to a positional restriction.

For these reasons, a self-supporting non-metallic aerial optical cable, as shown in FIGS. 2-4, has been designed which takes into consideration the increase in tension due to wind and snow to which the cable is exposed and also takes into consideration the high tension normally applied to a conventional self-supporting aerial cable.

In FIGS. 2-4, like numerals are used to designate like parts. FIG. 2 shows a non-metallic self-supporting aerial optical cable arranged so that a non-metallic optical cable core 20 and a suspension wire made of a non-metallic rod such as F.R.P. rod, with high Young's modulus, or cable and the like are arranged in parallel to one another, The optical cable and suspension wire are integrally covered with a plastic sheath 23 by disposing a neck portion 22 therebetween, and the suspension wire 21 supports the cable core 20.

FIG. 3 shows a modified form of a non-metallic self-supporting aerial optical cable arranged so that the non-metallic optical cable core 20 and the suspension wire 21 made of a nonmetallic rod are covered with separated plastic sheaths 24, 25, respectively. FIG. 3 also shows that an optical cable 26 is wound around the suspension wire 27 at a predetermined pitch.

Similarly to the modified form shown in FIG. 3, another modified form of the non-metallic self-supporting aerial optical cable, shown in FIG. 4, is arranged so that an optical cable 26 and a suspension wire 27 are covered with the separated plastic sheaths 24, 25 and are disposed in parallel to each other. In this arrangement, the optical cable and suspension wire are circumferentially wound by one or more Kevlar rods coated with plastic or a binding wire 28 of a high tensile fiber element, in order to have the suspension wire 27 support the optical cable 26.

The non-metallic aerial optical cables arranged as described above, create problems which will be discussed hereinafter.

In general, the F.R.P. rod or Kevlar rod has a Young's modulus of about 5000 kg/mm$^2$–7000 kg/mm$^2$, which is smaller than the Young's modulus of a steel wire, normally employed in a suspension wire, of about 20,000 kg/mm$^2$. Thus the Young's modulus of an F.R.P. rod or Kevlar rod is about $\frac{1}{4}$–$\frac{1}{66}$ of that of a steel wire. It is well-known that, in an optical cable, if excess tension is applied thereto for hours, static fatigue will result which will eventually lead to fractures. For this reason, the optical cable is required to have an elongation of less than 0.2% (guaranteed for more than ten year's life) of allowable tension on the cable. As a result, if the tensile force of an optical cable which is accompanied by a suspension wire such as an F.R.P. rod or a Kevlar rod and the like, is to be set for 0.2% elongation of the cable, and if the same condition (tension and slack) is provided in an optical cable with the conventional steel suspension wire, then a nonmetallic rod having a diameter of 1.7–2 times more than that of the steel wire will be required. This will, of course, present problems such as increasing the wind pressure and load, reducing the flexibility of the cable, and increasing the expense of the cable.

SUMMARY OF THE INVENTION

The present invention is provided in light of the aforementioned problems. It is an object of the invention to provide a nonmetallic self-supporting aerial optical cable, the outer diameter of which is substantially the same as the optical cable used with a conventional metallic suspension wire, and which provides allowable tension for ten year's use and which is easily installed.

Thus, the present invention has been designed to provide support means for a suspension wire and an optical cable such that the optical cable extends substantially parallel to the suspension wire with the support means securing the optical cable to the suspension wire at spaced locations. The length of the optical cable between adjacent spaced locations is greater than the length of the suspension wire between the adjacent spaced locations.

BRIEF DESCRIPTION OF THE DRAWINGS

FIGS. 2–4 each show various configurations of conventional non-metallic self-supporting aerial optical cables.

FIG. 5 shows a configuration of a non-metallic self-supporting aerial optical cable according to the present invention.

DETAILED DESCRIPTION OF THE INVENTION

Figure 2A:
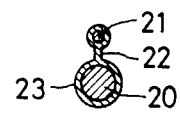
FIGS. 2(a), 3(a), and 4(a) and sectional views
Figure 2B:
FIGS. 2(b), 3(b), and 4(b) are side views.
Figure 3A:
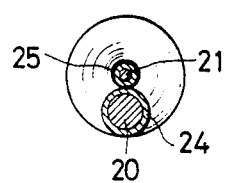
Figure 3B:
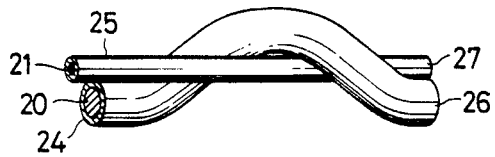
Figure 4A:
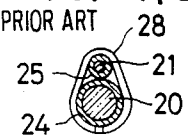
Figure 4B:
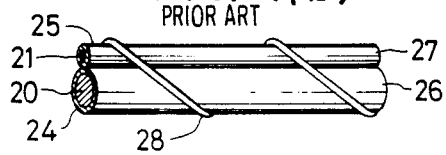

One embodiment of the invention will be explained hereinafter by reference to the drawing. Like numerals in FIGS. 2-4 are used to designate like parts in FIG. 5.

Figure 1:
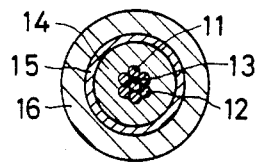
FIG. 1 is a sectional view showing one form of a nonmetallic optical cable.
Figure 5A:
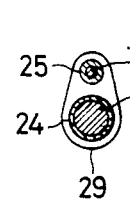
FIG. 5(a) is a sectional view and FIG. 5(b) is a side view.
Figure 5B:
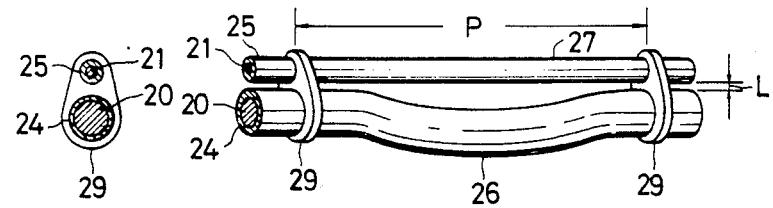

In FIG. 5, the non-metallic optical cable 20 and the suspension wire 21 made of non-metallic rods, such as an F.R.P, rod or a Kevlar rod and the like are covered with the separated plastic sheaths 24, 25. The non-metallic optical cable 20 is fabricated in the same manner as the cable shown in FIG. 1. The optical cable 26 and the suspension wire 27 are spaced apart and in parallel to each other and are held in predetermined dimensions by connecting members 29 disposed at given intervals P.

Each of the connecting members 29 may be obtained by a plastic injection mold method to be in the form of a collar in such a manner that the optical cable 26 and the suspension wire 27 are circumferentially wrapped. The connecting member 29 may be made of the same material as the plastic sheaths 24 and 25 thereby solidifying its connecting action, or may be formed integrally with the plastic sheaths 24 and 25 for the cable core 20 and the suspension wire 21, if desired. Such an arrangement is similar to that of the optical cable described in Japanese Utility Model publication No. 56-86712. However, the present invention is characterized in that a certain slack is provided for the optical cable 26, and that the optical cable 26 and the suspension wire 27 are connected in parallel to each other.

A further feature of the invention will be apparent from the following description. Adjacent connecting members 29 are spaced apart from each other a particular distance with the suspension wire 27 between adjacent connecting members 29 being substantially equal to this distance. The optical cable between adjacent connecting member 29 has a length which is 0.2-2.0% greater than that of the suspension wire, thereby providing slack in the optical cable. The optical cable 26 may be readily slackened when the connecting members 29 are injection molded. More specifically, by interposing between the connecting members 29, and between the optical cable 26 and the suspension wire 27, a plastic member of thickness calculated according to a slack rate required for the optical cable.

With the arrangement mentioned above, for example, if 0.6% slack is given to the optical cable 26, an elongation percentage of the optical cable 26 is "0" even when the suspension wire 27 is elongated 0.6% under tension. When the suspension wire 27 is elongated 0.8%, 0.2% elongation (allowable tension) is provided for the optical cable 26. Accordingly, as compared to the conventional arrangement, the optical cable of the same material and size is able to withstand four times the tension and Young's modulus of the equivalent high tensile member. For this reason, the instant optical cable with a non-metallic suspension wire may be aerially laid in the same condition as in the conventional self-supporting cable accompanied by the metallic suspension wire, without enlarging the outer diameter of the cable. As is made clear from Japanese Utility Model Publication No. 56-86712('81) filed by the present applicant, the optical cable of the present invention is not prone to snow build-up on the cable and is thus fully available for heavy snow localities. The optical cable of the present invention uses a non-metallic suspension wire and is not positionally restricted. As a result, its installation is facilitated.

As precisely set forth above, an optical cable according to the present invention is of substantially the same outer diameter as that of the conventional optical cable with a metallic suspension wire.

Further, the optical cable is capable of withstanding a sufficient tension to make it suitable for long-term use, and it is also easy to install.

We claim:

1. In an aerial optical cable suspension system of the type comprising a suspension wire, an optical cable and a plurality of spaced support means for hangingly supporting said optical cable from said suspension wire such that said optical cable extends substantially parallel to said suspension wire, said spaced support means securing said optical cable to said suspension wire at respective spaced locations, wherein the improvement comprises:
   an optical cable, the length of said optical cable between successive support means being greater than the length of said suspension wire between said successive support means to thereby provide slack in said optical cable whereby an elongation of said suspension wire results in a lesser elongation of said optical cable.

2. An aerial optical cable, as claimed in claim 1 wherein said suspension wire is comprised of non-metallic components.

3. An aerial optical table as claimed in claim 1, wherein said optical cable is comprised of non-metallic components.

4. An aerial optical cable, as claimed in claim 1, wherein said support means is comprised of non-metallic material.

5. An aerial optical cable, as claimed in claim 1, wherein said length of said optical cable between successive support means is 0.2-2.0% greater than said length of said suspension wire between those successive support means.

6. An aerial optical cable, as claimed in claim 1, wherein said support means is formed integrally with said optical cable and said suspension wire.

7. An aerial optical cable, as claimed in claim 1, said optical cable having a first sheath, said suspension wire having a second sheath and wherein said support means and said first and second sheaths are comprised of plastic materials.

* * * * *